(12) United States Patent
Heath (10) Patent No.: US 7,455,268 B2
(45) Date of Patent: Nov. 25, 2008

(54) HANGER FOR FIRE SPRINKLER PIPE (75) Inventor: Richard W. Heath, Yorba Linda, CA (US)

(73) Assignee: Nibco, Inc., Elkhart, IN (US)

( * ) Notice: Subject to any disclaimer, the term of this patent is extended or adjusted under 35 U.S.C. 154(b) by 0 days.

(21) Appl. No.: 10/446,292

(22) Filed: May 28, 2003

(65) Prior Publication Data

US 2004/0238697 A1 Dec. 2, 2004

(51) Int. Cl.
*F16L 3/08* (2006.01)
*F16L 3/12* (2006.01)

(52) U.S. Cl. ...................................... 248/74.1; 248/65

(58) Field of Classification Search .................. 248/65, 248/67.7, 67.5, 68.1, 71, 73, 74.1, 74, 74.4, 248/74.3

See application file for complete search history.

(56) References Cited

U.S. PATENT DOCUMENTS

| 1,585,840 | A | * | 5/1926 | Fahnestock | ................. 439/828 |
| 2,616,646 | A | * | 11/1952 | Matthysse | .................... 248/65 |
| 3,044,739 | A | | 7/1962 | Attwood | |
| 3,802,655 | A | | 4/1974 | Schuplin | |
| 3,888,439 | A | * | 6/1975 | Tuttle | .......................... 248/62 |
| 4,039,744 | A | * | 8/1977 | Seaquist | ..................... 174/169 |
| 4,097,015 | A | * | 6/1978 | Frishman | ..................... 248/339 |
| 4,676,151 | A | * | 6/1987 | Gorsuch et al. | ............... 99/450 |
| 4,861,081 | A | * | 8/1989 | Satoh | ....................... 292/336.3 |
| 4,870,722 | A | * | 10/1989 | Shell, Jr. | ..................... 24/16 R |
| 4,958,792 | A | * | 9/1990 | Rinderer | ..................... 248/74.2 |
| 5,121,894 | A | * | 6/1992 | Twork et al. | ............. 248/316.7 |
| 5,297,890 | A | | 3/1994 | Commins | |
| 5,344,108 | A | | 9/1994 | Heath | |
| 5,725,185 | A | * | 3/1998 | Auclair | ..................... 248/74.2 |
| 6,010,099 | A | | 1/2000 | Wertz et al. | |
| 6,138,960 | A | | 10/2000 | Carbonare et al. | |
| 6,241,199 | B1 | | 6/2001 | Ismert | |
| 6,460,813 | B1 | * | 10/2002 | Gretz | .......................... 248/62 |
| 6,508,440 | B2 | | 1/2003 | Schmidt | |
| 6,613,981 | B1 | * | 9/2003 | Hathcock et al. | ............. 174/69 |
| 6,622,976 | B1 | * | 9/2003 | Ianello | ....................... 248/73 |
| 6,629,675 | B1 | * | 10/2003 | Bjorklund et al. | ............ 248/49 |
| 2002/0066834 | A1 | | 6/2002 | Choi | |
| 2002/0066836 | A1 | | 6/2002 | Heath | |

FOREIGN PATENT DOCUMENTS

JP 05086687 A 4/1993

* cited by examiner

*Primary Examiner*—Amy J. Sterling
(74) *Attorney, Agent, or Firm*—Knobbe, Martens, Olson & Bear, LLP (57) ABSTRACT

A one-piece hanger is formed with a pair of spaced segments or legs joined by an end wall. Each segment has a recess formed in an edge which is open towards the recess on an edge of the opposite segment. The two recesses are aligned so as to create a substantially full opening to receive a pipe. The hanger may be positioned on a pipe with the segments extending substantially parallel to the pipe axis, and the hanger can then be rotated about 90° so that the pipe extends through the substantially full opening formed by the recesses. The hanger end is formed with mounting holes.

7 Claims, 7 Drawing Sheets

HANGER FOR FIRE SPRINKLER PIPE

BACKGROUND OF THE INVENTION

1. Field of the Invention

This invention relates in general to hangers for attaching pipes to structural support members and in particular for hangers used to support overhead pipes in fire protection sprinkler systems.

2. Description of the Related Art

Typically in automatic fire sprinkler systems, pipe is placed in concealed spaces which are made by the framing members of the particular structure in which the system is being installed. In order to avoid excessive drilling of holes through structural members or supports in which to extend the pipe, installers generally attempt to install the pipe in the natural channels which parallel the supports. This space is generally above the finished ceiling visible to the building occupant. This finished ceiling, which is generally attached to the bottom of the supports, is typically fabricated from a relatively soft sheet-rock or fiberglass tile.

Thus, it is desirable to have a hanger or bracket which will attach to a support and hold the pipe in place. Such pipe hangers that have been developed in the past generally clamp the pipe flush with the support. This is a problem, because the necessary adapter fitting which is positioned in the pipe and in the sprinkler head is of a larger diameter than the pipe, and thus does not allow the sprinkler head to fit in a correct installation when the pipe is mounted flush against the structural member.

The pipe and adapter need to be offset from the support in order to allow space for the adapter and the sprinkler head to sit properly. This is typically accomplished by attaching blocks of wood between the support and the hanger. Unfortunately, a significant amount of time and effort is required to attach the blocks to the supports, and then the hangers to the blocks. Additionally, this requires the installer to have available a sufficient number of wood blocks. It is also quite time consuming to attach a wood block, and then attach a pipe via a bracket or hanger.

Another concern in the installation of such sprinkler systems is the possibility of an upward surge when the water pressure is suddenly released. This surge could be strong enough to cause the sprinkler head to push through the relatively soft sheet-rock of the finished ceiling and spray water above the sheet-rock, thus rendering the sprinkler useless in putting out a fire below the level of the visible ceiling. In fact, an industry standard exists which requires a fire sprinkler installation to withstand an upward surge of at least 340 pounds.

Some hangers have been developed to replace the wooden block approach described above. However, further improvements are desirable. More specifically, it is desirable to have a hanger which provides the necessary standoff from a support structure, but at the same time is sufficiently low in cost and high in convenience that it can also be used in situations in which the standoff feature is not mandatory. This reduces inventory for manufacturers and users of such hangers.

It is therefore an object of the present invention to provide a pipe hanger for a fire protection sprinkler system pipe, capable of holding the pipe spared from the support to which it is attached, without the use of wood blocks or other superfluous parts. It is another object of the present invention to provide a pipe hanger with an incorporated surge-protecting component. It is yet another object of the present invention to provide a pipe hanger with improved ease of installation.

SUMMARY OF THE INVENTION

In accordance with the invention, a one piece pipe hanger is provided that is preferably made from a flat sheet of stiff but bendable metal. The completed hanger has a pair of spaced, substantially parallel segments that are joined by an end wall. The space between the segments is sized so that a pipe to be supported can be positioned between the segments, with the pipe extending in a plane roughly parallel to the segments. Each of the segments has a recess on one side edge sized to receive about one-half of the cross-section of the pipe. The segment recesses face each other and have a substantially common center line so that the recesses form a substantially full opening when viewed aligned with the common center line. That is, the segment recesses are spaced from each other; but taken together, they form an opening configured to receive the pipe. In order to position the pipe in the opening, the hanger may be rotated about 90° about its axis so the pipe fits in the full opening with the common center line of the recesses substantially aligned with the longitudinal axis of the pipe.

Preferably, the segment recesses have approximately a semi-circular shape and thus together form a substantially circular shape corresponding to that of the pipe. Preferably also, the segment edge recesses are formed by short generally semi-cylindrical portions that extend away from each other and are somewhat rounded on their ends so that sharp edges are not presented to the pipe when the hanger is rotated on the pipe into the desired position.

To mount the hanger to a support, such as an overhead beam, the hanger end wall is formed with openings to receive a fastener adapted to be mounted to the support. Preferably the end wall has a central portion which protrudes towards the edge recesses with the protrusion having a pair of holes, one on each side of a reference line passing through the center of the protrusion and said common center line. Each of the holes has an axis angled with respect to the reference line so that a fastener may be inserted through either of the holes without interference with a pipe positioned in the full opening.

The hanger can conveniently and economically be stamped and formed from a metal plate. The plate is first cut to form the two segments and the connecting end wall with an edge recess formed in each of the segments. Each segment has its recess side facing opposite sides of a line connecting center points of the openings. Preferably, the portions of the plate forming the recesses are deformed or flared into short semi-cylindrical portions extending away from the plane of the plate. Also, the ends of the segment remote from the end wall are flared slightly out of the plane of the plate in a direction opposite to that of the semi-cylindrical portions.

Also, in that same step, the central portion of the end wall is formed to create a protrusion which protrudes in a direction opposite to that of the flared edge recesses. The center of the protrusion preferably extends along the line extending between the center points of the two-recess openings. A pair of holes are formed in the protrusion on opposite ends of the center of the protrusion so that the axis of each of the holes angles away from the line extending between the edge recesses.

As a final step, the flat sheet is bent along two substantially parallel lines which are perpendicular to the line joining the centers of the edge recess opening, with the segments being bent about 90° towards each other to extend in generally parallel relation spaced about the diameter of the pipe to be supported. Each recess is spaced the same distance from the end wall so that the two recesses are aligned to form the pipe receiving opening referred to above.

Advantageously, the one-piece construction simplifies the installation procedure on an overhead pipe. The installer simply needs to position the hanger so that the pipe is between the segments with the axis of the pipe approximately intersecting the common center line of the recesses in the support. It is then only necessary to rotate the hanger about 90° about the axis of the pipe to position the pipe within the support opening. The described hanger is useful for situations in which spacing between the support and the pipe is needed as well as in situations where this is not needed. Consequently, only a single hanger needs to be manufactured and inventoried.

All of the embodiments discussed above are intended to be within the scope of the invention herein disclosed. These and other embodiments of the present invention will become readily apparent to those skilled in the art from the following detailed description of the preferred embodiments having reference through the attached figures, the invention not being limited to any particular preferred embodiment disclosed.

DETAILED DESCRIPTION OF THE PREFERRED EMBODIMENT

Figure 1:
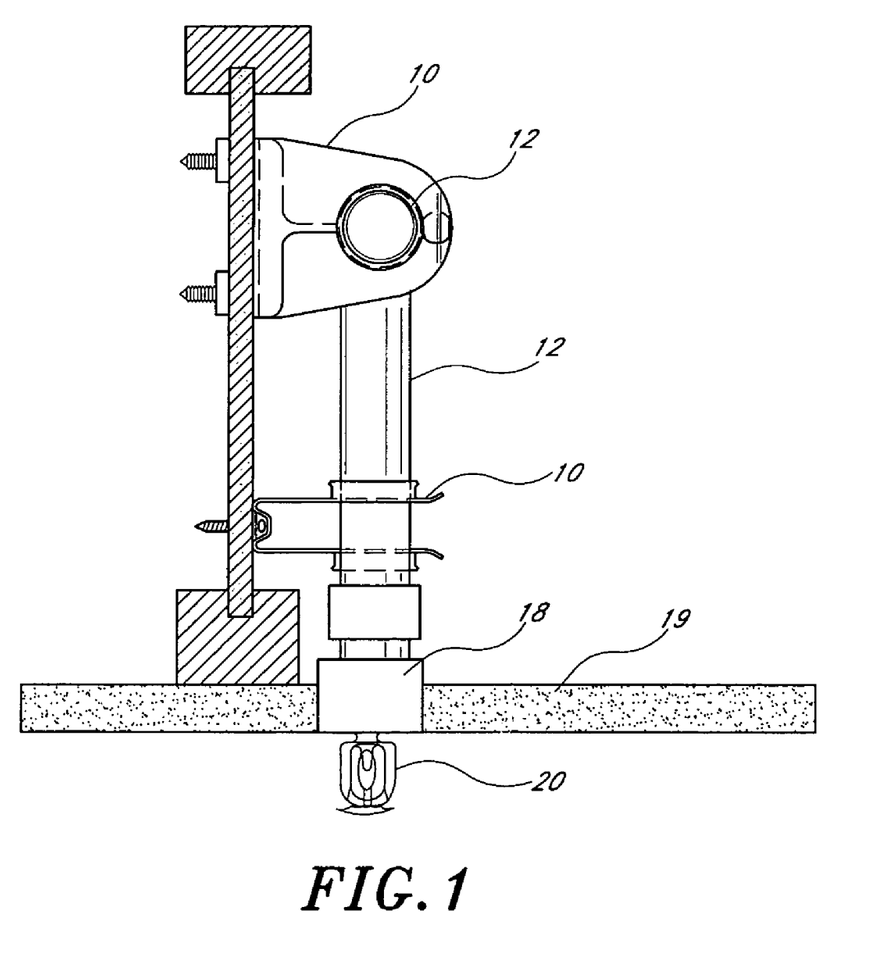
FIG. 1 is an end view of a structural member to which is attached a fire protection sprinkler system using hangers having features and advantages of the present invention.
Figure 2:
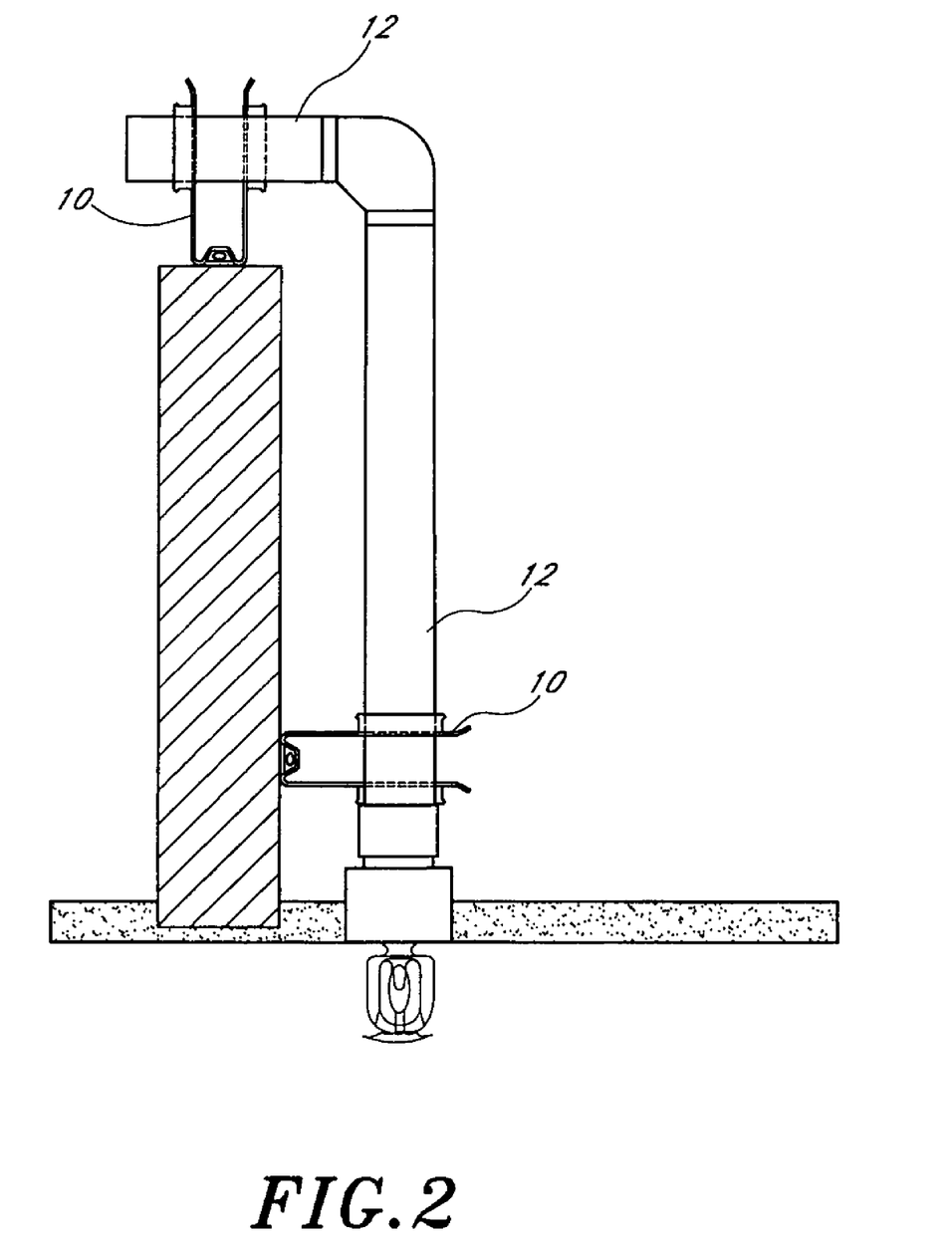
FIG. 2 illustrates an alternative installation of a fire protection sprinkler system using the hanger of the present invention.

FIGS. 1 and 2 show fire protection sprinkler installations showing a pipe 12 fixed to a support by a pair of hangers 10 of the present invention. In FIG. 1, the upper hanger extends laterally away from a vertical support to space a horizontal pipe away from the vertical support. The lower hanger is positioned 90° with respect to the upper one and spaces a vertical pipe away from the vertical support. The lower end of the vertical pipe has an adapter 18 positioned thereon and mounted within a ceiling 19 with a sprinkler head 20 extending below the ceiling. As can be seen, the hangers space the pipes away from the vertical support so that the adapter 18 does not interfere with the mounting of the sprinkler head 20.

In FIG. 2, the vertical pipe is supported by a lower hanger in the same fashion illustrated in FIG. 1, but the upper hanger positions a horizontal pipe extending above the support in that arrangement, the upper hanger is positioned to prevent upward movement of the pipe in the event an upward surge is applied to the pipe when water pressure is applied to the sprinkler system. Thus the upper hanger prevents the sprinkler head from moving upwardly above the ceiling.

Figure 3:
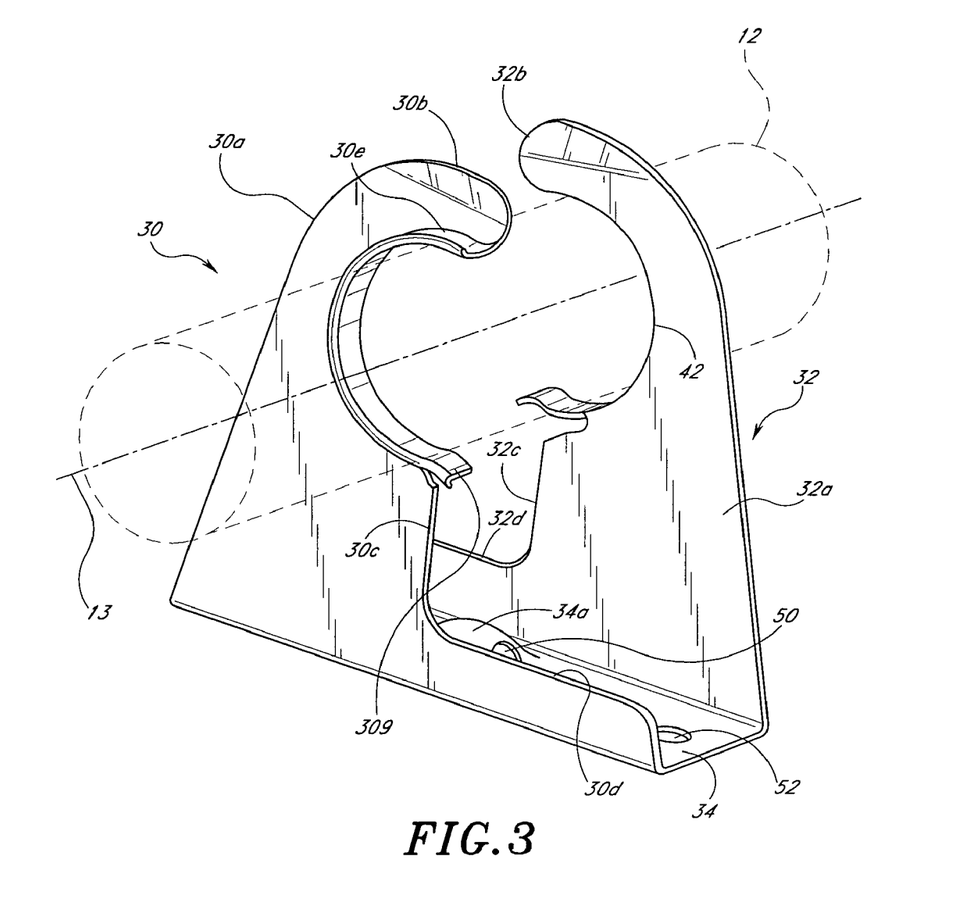
FIG. 3 is a perspective view of a hanger of the present invention with a broken line showing of a pipe supported by the hanger.
Figure 4A:
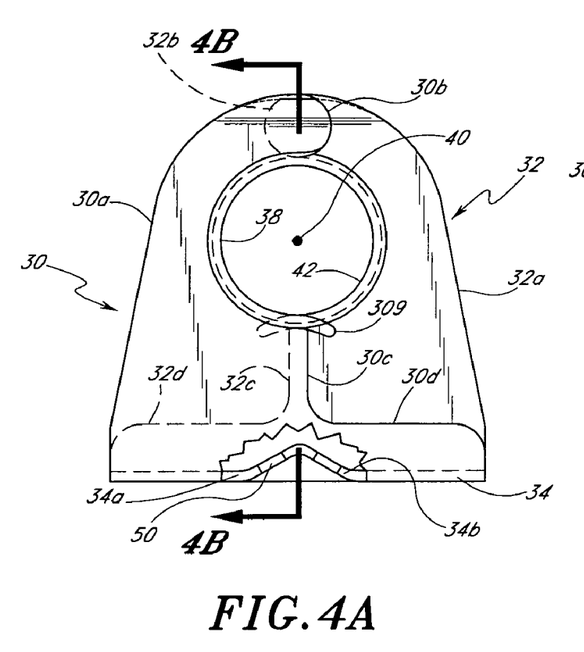
FIG. 4A is a front elevational view of the hanger.
Figure 4B:
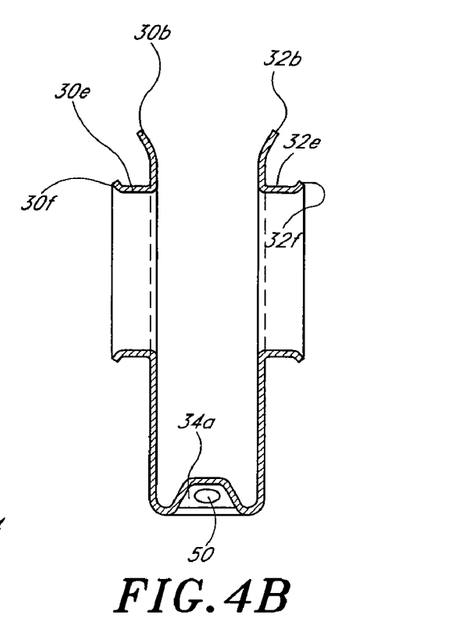
FIG. 4B is a cross sectional view of the hanger along line 4B-4B of FIG. 4A.
Figure 4C:
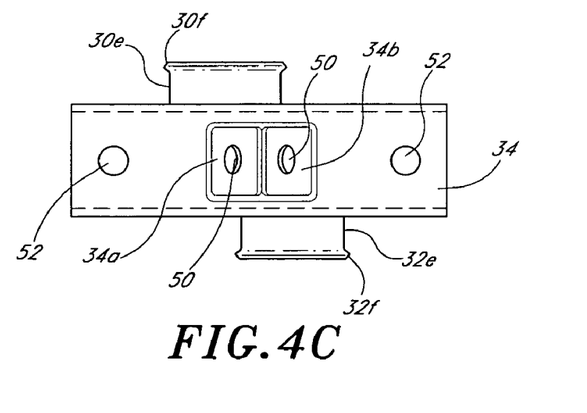
FIG. 4C is a top plan view of the hanger.

Referring to FIGS. 3 and 4, the hanger 10 includes a pair of main legs or segments which for convenience are referred to as a left segment 30 and a right segment 32, as viewed in FIGS. 3 and 4. The lower ends of the segments are joined by a substantially rectangular end wall 34. The segments 30 and 32 have generally a planer configuration and extend in spaced, substantially parallel relation. The space between the segments is preferably about equal to the diameter of the pipe 12.

The left segment 30 has a side edge 30a which slopes upwardly and inwardly and curves slightly beyond a reference line 4B-4B. A right edge of the left segment has a recess 38 which preferably has a semicircular shape, with a center line 40 which intersects the reference line 4B-4B. The recess 38 preferably extends slightly more than 180°, with a 180° portion of the recess being bounded by the reference line 4B-4B. Thus the tip 30b of the left segment 30 extends slightly to the right of the reference line 4B-4B. The lower edge of the recess 38 blends into a short vertical edge 30c of the segment 30 and then blends into a substantially horizontal edge 30d, bounding a short vertical wall which extends to the bottom wall 34. The recess 38 is actually bounded by a short semi-cylindrical wall 30e, as best seen in FIGS. 4B and 4C. The outer edge 30f of the wall 30e is flared outwardly. It may also be seen from FIG. 4B that the upper edge or tip 30b is flared outwardly, away from the space between the segments 30 and 32. As best seen in FIG. 3, the segment 30 adjacent the lower tip 30g of the wall 30e is partially cut away to allow that tip to flex somewhat to facilitate the insertion of the hanger onto a pipe 12.

The right segment 32 is essentially a mirror image of the left segment 30. It includes an outer edge 32a extending upwardly and inwardly from the right edge of the bottom wall to an upper edge 32b. A recess 42 is formed along its left edge which has a substantially semi-cylindrical shape, with the recess center substantially aligned with the center line 40 of the left recess 38. The recess 42 is formed by a short semi-cylindrical wall 32e extending outwardly from the space between the segments and having its outer edge 30f flared outwardly away from the center of the recess. The right segment 32a also has a short vertical edge 32c extending downwardly from the recess 42 and merging into a horizontal edge 32d bounding a short vertical which extends downwardly to the bottom wall 34 and to the left edge of the bottom wall. As with the recess 38, the recess 42 preferably extends slightly more than 180°, with a 180° portion being bounded by the reference line 4B-4B which passes through the center line 40 of the recesses. Consequently, the vertical edges 30c and 32c overlap a small amount, and likewise the upper edge or tip portions 30b and 32b overlap. This may be seen in FIG. 4A, and is consistent with the cross-hatching in FIG. 4B. As also seen from FIG. 4B, the upper segment ends 30b and 32b are flared outwardly away from each other to facilitate the entry of the hanger onto a pipe.

From the drawings it can be seen that the open mouths of the recesses extend in opposite directions so that the two semi-circular recesses form a full opening when viewed on the centerline 40 as seen in FIG. 4A.

As best seen from FIGS. 4A and 4B, the edge or bottom wall 34 has a protrusion extending upwardly creating a left angled segment 34a and a right angled segment 34b. The protrusion is centrally positioned on the bottom wall, thus being centered on the reference line 4B/4B. As seen, the protrusion extends upwardly towards the center line 40 of the recesses 38 and 42. Each of the angled segments 34a and 34b has a hole 50 for receiving a fastener. The segments 34a and 34b are angled such that a line perpendicular to either of the segments and passing through the center of a hole 50, does not intersect the recesses 38 or 42. This permits installation of a fastener through either of the holes without interference by a pipe extending through the substantially full opening formed by the recesses 38 and 42.

As seen in FIG. 4C, the bottom wall is preferably also provided with a pair of additional mounting holes 52 adjacent the ends of the bottom wall.

Figure 5A:
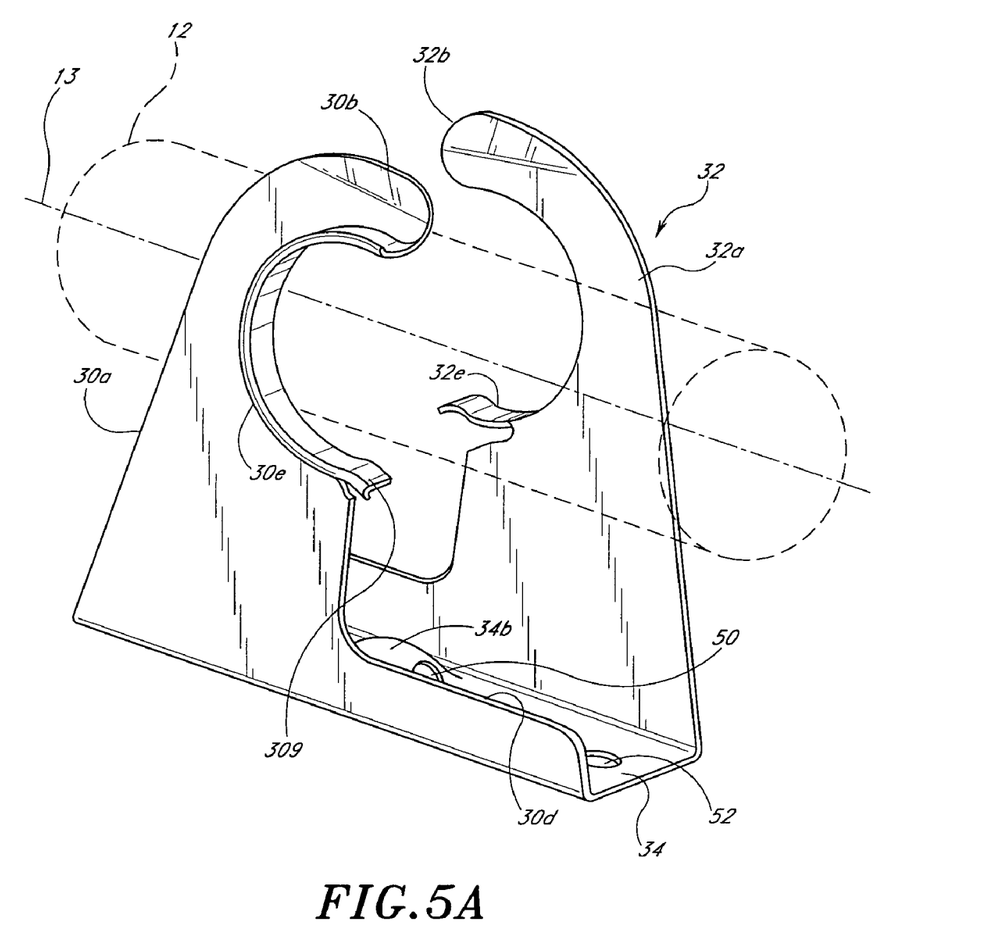
FIG. 5A is a perspective view of the hanger in an initial position when being installed on a pipe.
Figure 5B:
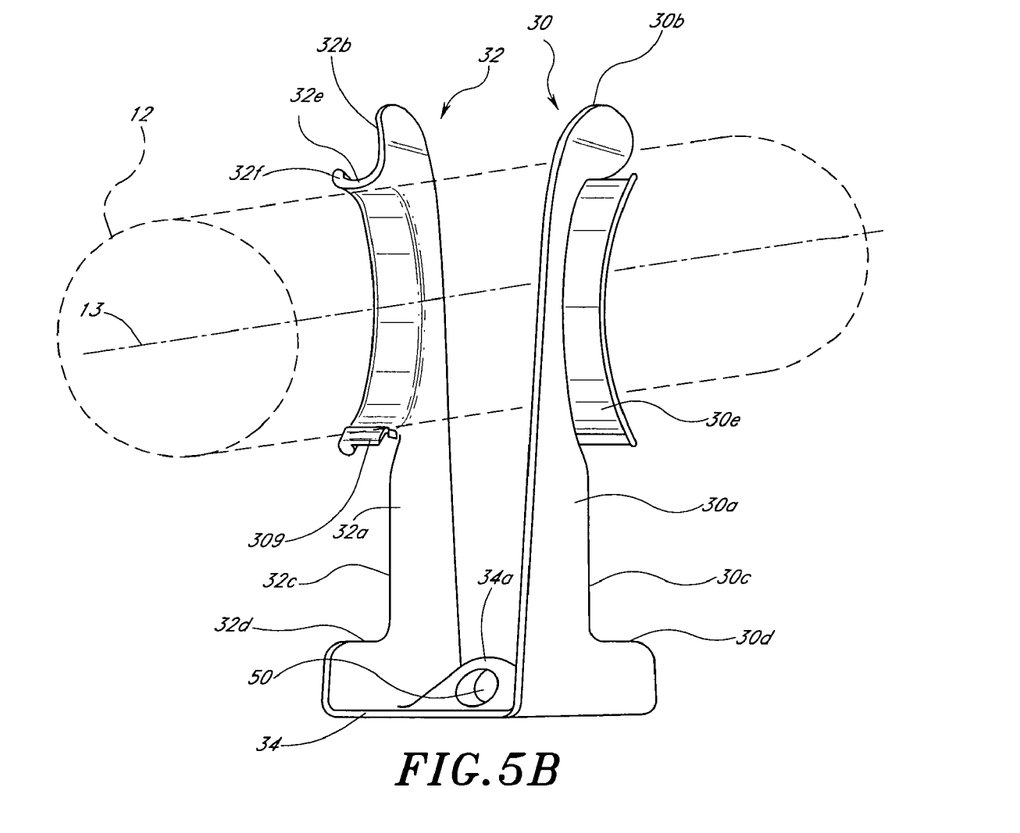
FIG. 5B is another view of the hanger and pipe of FIG. 5A from a different perspective.

In use, a hanger is slid onto a pipe so that the hanger segments straddle the pipe as shown in FIGS. 5A and 5B. The hanger bottom wall 34 should be oriented substantially parallel to the pipe axis 13, and the common center line 40 of the recesses 38 and 42 should be positioned to be approximately perpendicular to the pipe axis 13 as shown in FIG. 5.

In that position, the hanger can be rotated about 90° in one direction, namely, in the direction of the open mouths of the recesses 38 and 42. The hanger semi-cylindrical portions 30e and 32e prevent rotation in the opposite direction. With the hanger rotated 90° it is then positioned as shown in FIG. 3, wherein the pipe is captured within the opening formed by the two recesses. That is, even though the recesses are spaced from each other, they form together substantially a full opening with its common center line 40 being aligned with the axis 13. The flared segment edges 30f and 32f on the outer ends of the semi-cylindrical portion 30e and 32e prevent damage to the typically plastic piping.

If the pipe is already supported in an overhead position, the hanger can be slid on the pipe to its desired mounting position. Similarly, if the pipe has not yet been supported from above, the pipe with one or more hangers loosely positioned thereon may be raised to its desired location. One of the advantages of the hanger is that the angled walls on the central protrusion in the bottom wall enable a fastener to be inserted through one of the holes 50 and installed without interference by the pipe. In many locations, a single fastener through one hole 50 in one of the protrusion walls is sufficient. However, if a more secure fastening is needed, fasteners may be positioned in both holes and in the additional holes 52 in the bottom wall 34.

Figure 6:
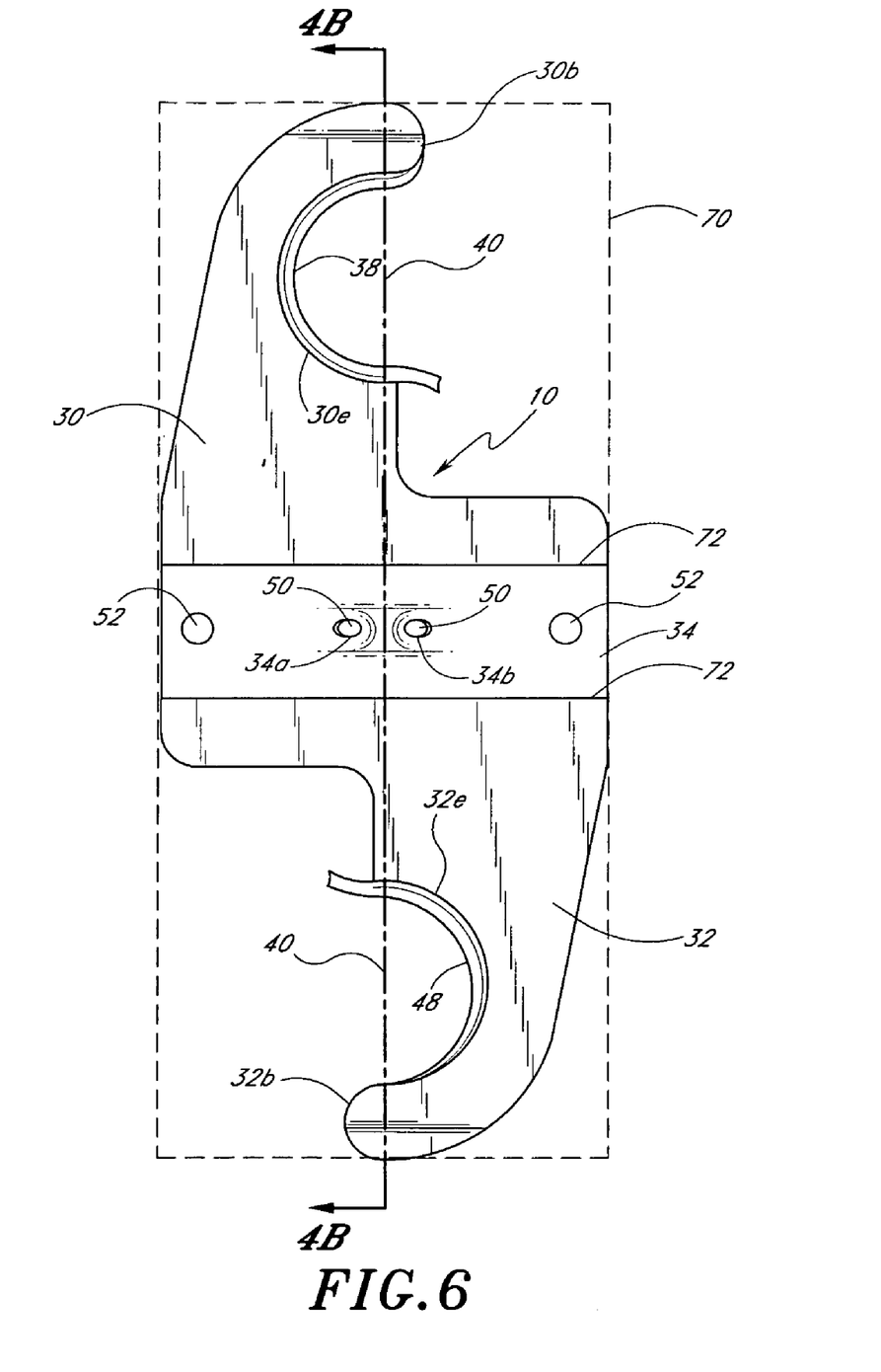
FIG. 6 illustrates a method by which the hanger can be fabricated.

Another advantage of the invention is that the hanger can be efficiently manufactured on a mass production basis with proper stamping and cutting equipment. Referring to FIG. 6, the hanger 10 is illustrated in flat form as being cut from a rectangular sheet 70. The segments 30 and 32 are shown on opposite sides of the connecting end wall 34. The semi-cylindrical walls 30e and 32e may be deformed from the metal plate to create the recesses 38 and 42. The center 40 of each recess is on a line 4B-4B which is perpendicular to lines 72 forming the edges of the end wall 34. The centers 40 are of course each equidistant from a respective one of the lines 72. The segment upper edges 30b and 32b may also be flared in that operation. Likewise, the protrusion forming the walls 34a and 34b can be formed in that same operation with the protrusion extending in a direction opposite to that of the semi-cylindrical walls 30e and 32e. The holes 52 adjacent the ends of the wall 34 may likewise be formed in that operation. The holes 50 in the angled walls 34a and 34b can also possibly be formed in that same step, but if not, can be formed in a separate step.

The flat hanger can then be bent about 90° along spaced, parallel lines 72 forming the edges of the bottom wall so that the segments 30 and 32 are positioned and spaced substantially parallel relation as viewed in FIG. 4b, to complete the operation.

Advantageously, only a single hanger style is required in that the hanger can be used to simply support a pipe or to space the pipe from a support to provide the necessary clearance for a sprinkler system. Having a single design minimizes inventorying expenses for manufacturers and installers. The one-piece design also facilitates installation procedures in that an installer need not juggle two pieces while standing in a sometimes precarious overhead position. Also, the efficient manufacturing process described above minimizes the manufacturing expenses for large volume production.

While the foregoing describes a preferred arrangement, the invention is not limited to the embodiment illustrated. For example, while semi-circular recesses for receiving a pipe is the preferred shape, straight-walled recesses could be employed if desired. While it is preferable that the recesses extend slightly more than 180° so as to best secure a pipe, recesses extending somewhat less than 180° are possible. Also, while not considered necessary, the main segments could have wall portions that extend over the ends of the bottom wall 34 to provide additional strength to the structure. While the preferred spacing between the segments is approximately equal to the diameter of the pipe on which it is to be mounted, it may be desirable to have the open ends of the segments spaced somewhat closer than that in that the hanger can be forced onto the pipe by spreading the legs or segments slightly. That arrangement enables the hanger to be captured on a pipe before the pipe is raised to its desired location. The hanger then can be rotated to its proper orientation when it is adjacent the support to which it is to be attached. Conversely, while that arrangement is convenient, the spacing between the segments can be larger than the diameter of the pipe to some degree, although that is a less stable arrangement. The thickness of the plate used to form the hanger is a matter of choice. However, utilizing sheet metal approximately 1/16" thick is a practical and efficient dimension in that the material is easily bendable, but at the same time can withstand great loads in the direction of the plane of the segments.

Although the invention has been disclosed in the context of certain preferred embodiments and examples, it will be understood by those skilled in the art that the present invention extends beyond the specifically disclosed embodiments to other alternatives and/or uses of the invention and obvious modifications and equivalents thereof. Thus it is intended that the scope of the invention herein disclosed not be limited by the particular embodiments described but should be determined only be a fair reading of the claims that follow.

What is claimed is:

1. A pipe hanger comprising a left leg, a right leg and an end wall,
   said end wall joining said left leg and said right leg such that said right leg is substantially parallel to said left leg, said left leg being spaced from said right leg by a distance that is substantially equal to a diameter of a pipe that is secured by said pipe hanger,
   said end wall comprises a protrusion and at least one mounting hole positioned along said protrusion such that an axis of the at least one mounting hole is skewed relative to the fixed axial centerline
   said left leg comprising a first side edge and a second side edge, a recess being defined by said second side edge, said recess having a generally semicircular shape that is centered about a fixed axial centerline of said pipe, said recess also having an angular dimension of slightly more than about 180 degrees, and a short semi-cylindrical wall extending in an axial direction along said recess,
   said right leg comprising a first side edge and a second side edge, a recess being defined by said second side edge, said recess having a generally semicircular shape that is centered about said fixed axial centerline, said recess also having an angular dimension of slightly more than about 180 degrees, and a short semi-cylindrical wall extending in said axial direction along said recess, and said first edge of said left leg and said first edge of said right leg being positioned on opposite sides of said axial direction and an opening defined by said semi-cylindrical wall of said right leg and said semi-cylindrical wall of said left leg being substantially equal to said diameter of said pipe that is secured by said pipe hanger.

2. The pipe hanger of claim 1, wherein said semi-cylindrical wall of said left leg extends on only one side of said left leg.

3. The pipe hanger of claim 2, wherein said semi-cylindrical wall of said left leg extends away from said right leg.

4. The pipe hanger of claim 1, wherein said left leg and said right leg are rigidly fixed relative to each other.

5. The hanger of claim 1, wherein said first leg, said second leg, said recesses of said first and second legs, and said end wall are arranged such that the pipe can be positioned directly between said first and second legs with the longitudinal axis of the pipe extending generally parallel to said end wall and generally parallel to the first and second legs, and arranged such that the pipe can then be rotated about 90°, while remaining generally parallel to said end wall, and until the pipe is positioned with its longitudinal axis generally parallel or coextensive with the common centerline and parallel to said wall and perpendicular to said first an second legs, wherein said wall, and said first and second legs are configured with sufficient strength to hang a water pipe from a overhead beam of a structure with only said end wall being secured to the overhead beam.

6. The pipe hanger of claim 1, wherein said end wall comprises at least two mounting holes.

7. The pipe hanger of claim 1, wherein said at least one mounting hole is positioned to be generally equidistant from said left leg and said right leg.

* * * * *

UNITED STATES PATENT AND TRADEMARK OFFICE
CERTIFICATE OF CORRECTION

PATENT NO. : 7,455,268 B2  Page 1 of 1
APPLICATION NO. : 10/446292
DATED : November 25, 2008
INVENTOR(S) : Richard W. Heath It is certified that error appears in the above-identified patent and that said Letters Patent is hereby corrected as shown below:

At Column 8, line 7, change "an" to --and--.

Signed and Sealed this

Second Day of June, 2009

JOHN DOLL
*Acting Director of the United States Patent and Trademark Office*